United States Patent
Rizkallah et al.

(10) Patent No.: US 9,042,815 B2
(45) Date of Patent: May 26, 2015

(54) WIRELESS DEVICE FOR PROVIDING NOTIFICATIONS ASSOCIATED WITH A MOBILE ELECTRONIC DEVICE

(75) Inventors: Gerard S. Rizkallah, Chicago, IL (US); Ahmed Abdelsamie, Nepean (CA); John Ivan Scharkov, Toronto (CA); Marc Elis Meunier, Kitchener (CA); Jeff Chi Shing Chan, Markham (CA); Douglas James Arthur Burrell, Waterloo (CA); Steven Henry Fyke, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 257 days.

(21) Appl. No.: 13/601,393

(22) Filed: Aug. 31, 2012

(65) Prior Publication Data
US 2014/0065955 A1    Mar. 6, 2014

(51) Int. Cl.
| H04B 5/00 | (2006.01) |
| H04M 1/00 | (2006.01) |
| H04B 1/38 | (2006.01) |
| G08B 5/22 | (2006.01) |
| H04M 1/02 | (2006.01) |
| H04M 19/04 | (2006.01) |

(52) U.S. Cl.
CPC ............ *G08B 5/224* (2013.01); *H04M 1/0283* (2013.01); *H04M 19/048* (2013.01)

(58) Field of Classification Search
USPC ............ 455/41.1, 41.2, 41.3, 66.1, 566, 567, 455/575.1, 575.8; 307/104; 340/204
See application file for complete search history.

(56) References Cited

U.S. PATENT DOCUMENTS

| 5,960,367 A | 9/1999 | Kita |
| 6,831,567 B2 | 12/2004 | Liao |
| 2008/0191892 A1* | 8/2008 | Kirkup et al. ............... 340/686.6 |
| 2008/0200208 A1 | 8/2008 | Llanos et al. |
| 2009/0312000 A1* | 12/2009 | Wakefield et al. ............ 455/418 |
| 2010/0277335 A1* | 11/2010 | Makela et al. .............. 340/815.4 |
| 2011/0294470 A1* | 12/2011 | Pasquero et al. ........... 455/412.2 |
| 2012/0035989 A1 | 2/2012 | Abel et al. |
| 2012/0052922 A1* | 3/2012 | Li ................................. 455/567 |

(Continued)

FOREIGN PATENT DOCUMENTS

| DE | 20206898 | 8/2002 |
| EP | 2388981 | 11/2011 |
| GB | 2414363 | 11/2005 |

OTHER PUBLICATIONS

Nicole and Heidi, "PCB LED Cell Phone Case", http://newtextiles.media.mit.edu/?p=1417, published Mar. 8, 2011, accessed May 31, 2012, 5 pages.

(Continued)

*Primary Examiner* — Nguyen Vo
(74) *Attorney, Agent, or Firm* — Fish & Richardson P.C.

(57) ABSTRACT

A wireless device for providing notifications associated with a mobile electronic device is provided. The device comprises: an indicator; a body enabled to mate with a mobile electronic device, the body comprising the indicator such that when the body is mated to the mobile electronic device, the indicator is not obscured by the body; an induction device for wirelessly receiving signals from the mobile electronic device to control the indicator; and, a circuit connecting the induction device to the indicator, the circuit enabled to receive the signals and control the indicator in response thereto.

17 Claims, 13 Drawing Sheets

(56) References Cited

U.S. PATENT DOCUMENTS

2012/0062531 A1* 3/2012 Enzmann et al. ............. 345/204
2013/0088410 A1* 4/2013 Hill et al. ..................... 345/1.1

OTHER PUBLICATIONS

Bill Ray, "Printable Mini-display Tech Draws Power from NFC Devices", The A Register, published Sep. 12, 2011, 5 pages.
European Patent Office, Examination Report issued in connection with European Patent Application 12182511.1, dated Apr. 3, 2014, 5 pages.
European Patent Office, Partial Search Report issued in EP Application No. 12182511.1, dated Feb. 19, 2013, 5 pages.
Canadian Office Action in Canadian Application No. 2821838, dated Jan. 26, 2015, 4 pages.
Counterpart Canadian Patent Application No. 2821838, "Examination Report" dated Jan. 26, 2015.

* cited by examiner

US 9,042,815 B2

WIRELESS DEVICE FOR PROVIDING NOTIFICATIONS ASSOCIATED WITH A MOBILE ELECTRONIC DEVICE

FIELD

The specification relates generally to induction devices, and specifically to a wireless device for providing notifications associated with a mobile electronic device.

BACKGROUND

The evolution of computers is currently quite active in the mobile device environment. Quiet notification indicators, such as light emitting diodes (LEDs) and the like, can be obscured either by the position (e.g. facedown) of the mobile device or by the location of the mobile device in a holster.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
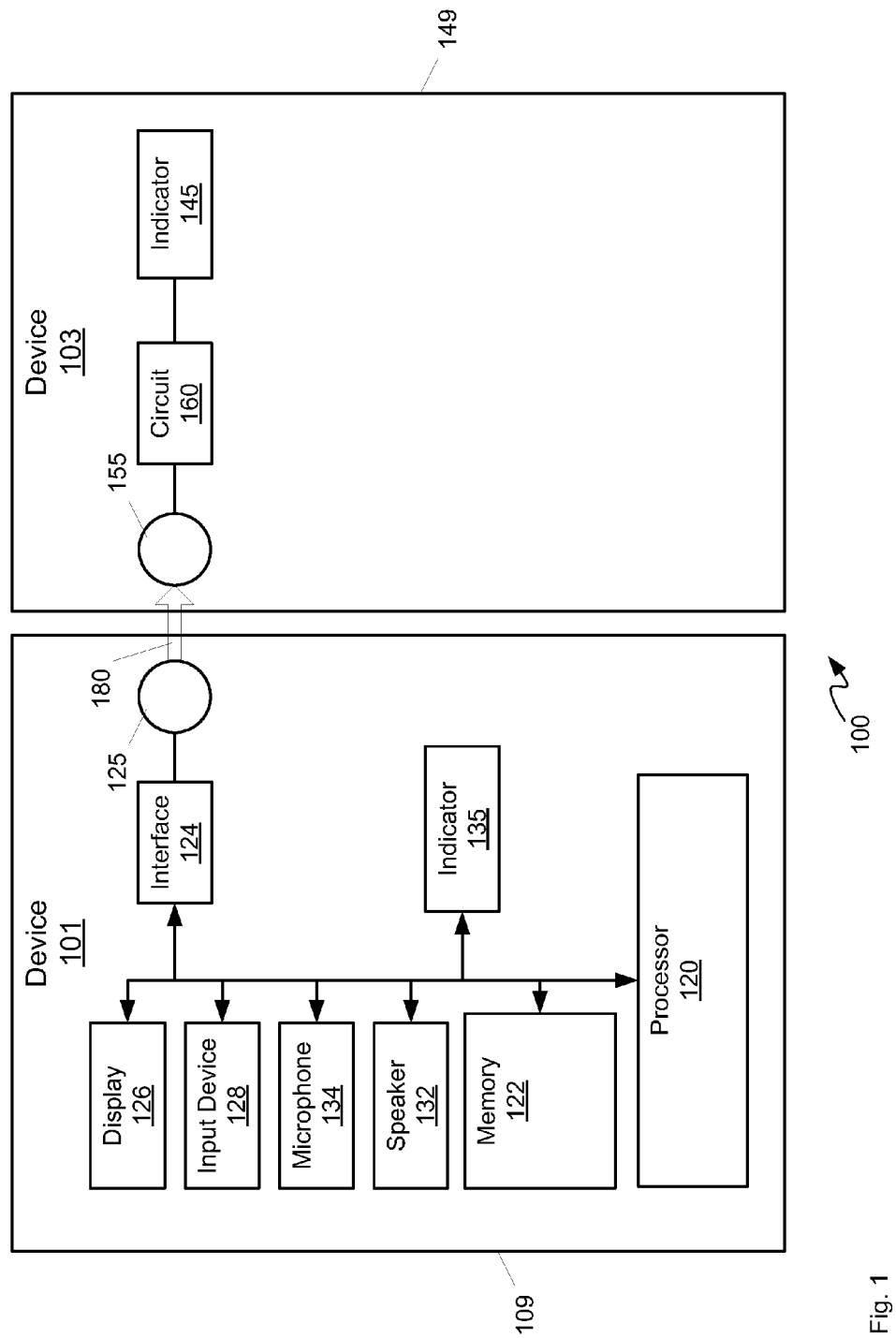
FIG. 1 depicts a schematic diagram of a system including a device for providing notifications associated with a mobile electronic device, according to non-limiting implementations.

In general, this disclosure is directed to a notification device for use with a mobile electronic device. In general, mobile electronic devices represent electronic devices that are readily movable from place to place. Such devices typically include an indicator for providing notification of events at the mobile electronic device including, but not limited to, receiving messages (e.g. emails, text messages etc.) and phone calls, calendar events, and the like. The indicator can include, for example, a display, a light and/or an LED (light emitting diode), a speaker, a vibratory motor, and the like. When the mobile electronic device is placed in a quiet mode, indicators that provide notifications that can be heard, such as speakers etc. (and in some instances the vibratory motor) are suppressed and quiet notifications are provided via the light/LED (typically located on a front of the mobile electronic device, adjacent the display) and/or the display. However, when the mobile electronic device is in the quiet mode and placed display face down and/or in a holster, the quiet notifications are obscured and/or hidden, which causes the notifications to be missed and hence the events that caused the notifications can also be missed. This can be especially problematic when the events are time specific, such as phone calls, calendar reminders and the like. This specification describes various implementations of a notification device that can be mated with a mobile electronic device to provide notifications associated with the mobile electronic device.

A first aspect of the specification provides a device comprising: an indicator; a body enabled to mate with a mobile electronic device, the body comprising the indicator such that when the body is mated to the mobile electronic device, the indicator is not obscured by the body; an induction device for wirelessly receiving signals from the mobile electronic device to control the indicator; and, a circuit connecting the induction device to the indicator, the circuit enabled to receive the signals and control the indicator in response thereto.

The body can comprise a tacky material, such that to mate the body with the mobile electronic device, the tacky material sticks to the mobile electronic device.

The body can comprise a skin that wraps around at least a portion of the mobile electronic device.

The body can comprise a holster for receiving the mobile electronic device. The induction device can be positioned at the holster for interacting with a respective induction device located at the mobile electronic device, the respective induction device for transmitting the signals. The holster can comprise at least one magnet for interacting with a holster indicator at the mobile electronic device, the induction device positioned at the holster to avoid the at least one magnet.

The indicator can comprise one or more of a light emitting diode (LED), a light, and a display.

The induction device can comprise one or more of an induction antenna, an antenna coil, and a near field communication (NFC) antenna, a loop antenna, an NFC loop antenna and RFID (radio frequency identification) antenna.

The circuit can comprise one or more of a conversion circuit, an energy harvesting circuit, a DC conversion circuit, a regulating circuit, an output low drop-out regulator (LDO) and a timing circuit.

The circuit can be further enabled to power the indicator from power received via the signals.

The device can further comprise one or more of a battery and a power pack for powering one or more of the circuit and the indicator.

The indicator can comprise one or more of an LED and a light, and the circuit can be enabled to flash one or more of the LED and the light when the signals are received.

The body can comprise a holster, the induction device can be located at a first wall of the holster for receiving the signals from the mobile electronic device when mated therewith, and the device can further comprise a second induction device located at a second wall of the holster opposite the first wall for receiving the signals from the mobile electronic device when mated with the holster in a direction opposite the first induction device. The second induction device can be connected to the circuit. The device can further comprise a second circuit similar to the circuit, the second circuit connecting the second induction device to the indicator, the second circuit enabled to receive the signals to operate the indicator. The device can further comprise a second indicator, wherein the indicator can be located at the first wall and the second indicator can be located at the second wall, each of the indicator and the second indicator connected to each of the induction device and the second induction device, each of the indicator and the second indicator controlled by one or more of the circuit and a second circuit.

The signals can comprise NFC polling mode signals, and the circuit can be further enabled to receive the NFC polling mode signals and control the indicator in response thereto.

The indicator can comprise a display, the signals can comprise data to be provided at the display, and the circuit can be enabled to control the display to provide a rendering of the data.

Another aspect of the specification provides a system comprising: a mobile electronic device; and a device comprising: an indicator; a body enabled to mate with the mobile electronic device, the body comprising the indicator such that when the body is mated to the mobile electronic device, the indicator is not obscured by the body; an induction device for wirelessly receiving signals from the mobile electronic device to control the indicator; and, a circuit connecting the induction device to the indicator, the circuit enabled to receive the signals and control the indicator in response thereto.

The mobile electronic device can comprise a respective induction device enabled to transmit the signals. The induction device and the respective induction device can each comprise respective NFC antennas, and the mobile electronic device can be enabled to enter an NFC polling mode to transmit NFC polling signals when a notification occurs at the mobile electronic device.

FIG. 1 depicts a system 100 comprising a mobile electronic device 101 and a notification device 103 for providing notifications associated with mobile electronic device 101, according to non-limiting implementations. Mobile electronic device 101 comprises a housing 109, which houses a processor 120 interconnected with a memory 122, a communications interface 124 connected to an induction device 125, a display 126, an input device 128, a speaker 132, a microphone 134, and an indicator 135. Communications interface 124 will be interchangeably referred to as interface 124.

Notification device 103 comprises: an indicator 145, a body 149 enabled to mate with mobile electronic device 101 (including but not limited to housing 109), body 149 comprising indicator 145 such that when body 149 is mated to mobile electronic device 101, indicator 145 is not obscured by body 149; an induction device 155 for wirelessly receiving at least one signal 180 from mobile electronic device 101 to control indicator 145; and, a circuit 160 connecting induction device 155 to indicator 145, circuit 160 enabled to receive signal 180 and control indicator 145 in response thereto. For example, body 149 can comprise a shape that, when body 149 is mated to mobile electronic device 101, indicator 145 is not covered by body 149. In some implementations, indicator 145 is located on an outside of body 149. Hence, notification device 103 can comprise body 149 enabled to mate with mobile electronic device 101, indicator 145 located on an outside of body 149. Alternatively, indicator 145 can be located internal to body 149, body 149 comprising a window for viewing indicator, indicator 145 located in the window. The window can be covered (e.g. with a transparent material, including but not limited to glass and a transparent plastic) or not covered (e.g. an opening in a surface of body 149).

Hence, each of mobile electronic device 101 and notification device 103 comprise respective induction devices 125, 155, which are enabled to communicate inductively, for example via signals 180, when in proximity with one another, for example, when body 149 is mated to mobile electronic device 101.

It is further appreciated that mobile electronic device 101 can enter a notification mode: for example, in some notification modes, processor 120 controls indicator 135 to provide a notification of an event, including, but not limited to, receipt of a message (e.g. emails, text messages etc.), receipt of a phone call, a calendar event and/or a calendar event reminder as indicated in, for example, a calendar database, and the like.

In a non-limiting example, indicator 135 can comprise an LED (light emitting diode), or the like, and processor 120 controlling indicator 135 comprises processor 120 controlling the LED to one or more of blink, change colour or the like, to provide a notification of the event. However, in present implementations, when mobile electronic device 101 enters a notification mode, processor 120 controls induction device 125 to transmit signal 180 to induction device 155, which receives signal 180, which is in turn received by circuit 160 to control indicator 145 in response thereto.

For example, when indictor 145 comprises an LED, circuit 160 can control indicator 145 to one or more of turn on, blink, change colour or the like, thereby providing a notification of the event at mobile electronic device 101. Hence, when indicator 135 at mobile electronic device 101 is obscured (for example, mobile electronic device 101 is facedown, or in a holster or the like), indicator 145 can provide a notification of the event at mobile electronic device 101. In some implementations, the notification provided at indicator 145 can be similar to the notification provided at mobile electronic device 101. As will presently be described, in some implementations, notification device 103 can comprise a holster, for example as described below with reference to FIG. 2.

It is appreciated that FIG. 1 further depicted schematic diagrams of each of mobile electronic device 101 and notification device 103, which will be hereafter be described in further detail.

It should be emphasized that the structures of mobile electronic device 101, 103 in FIG. 1 are purely examples. For example, as depicted in FIG. 1, it is contemplated that mobile electronic device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions.

Mobile electronic device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of mobile electronic device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

Processor 120 can be further configured to communicate with display 126, microphone 134 and speaker 132. Display 126 comprises any suitable one of, or combination of, CRT (cathode ray tube) and/or flat panel displays (e.g. LCD (liquid crystal display), plasma, OLED (organic light emitting diode), capacitive or resistive touch screens, and the like). Microphone 134 comprises a microphone for receiving sound data at mobile electronic device 101. Speaker 132 comprises a speaker for providing sound data, audible alerts, audible communications from remote communication devices, and the like, at mobile electronic device 101. Processor 120 can also control one or more of display 126 and speaker 132 to provide notifications.

Processor 120 also connects to interface 124, which is enabled to communicate with at least notification device 103 via induction device 125, as will be described below. In some implementations, induction device 125 comprises a near field communication (NFC) antenna and hence, in these implementations, interface 124 comprises an NFC interface for transmitting and receiving NFC signals via the NFC antenna.

However, in some implementations, interface 124 (and/or another communications interface, not depicted) can be optionally implemented as one or more radios and/or connectors and/or network adaptors, configured to wirelessly communicate with one or more communication networks (not depicted). It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted).

Housing 109 can comprise any housing, casing, and the like, enabled to be at least one of held and carried by a human hand. In general, housing 109 houses the components of mobile electronic device 101; however some components can be visible via apertures, windows and the like in housing 109. For example, display 126 is generally visible. In implementations where indicator 135 comprises an LED, indicator 135 is also visible.

However, indicator 135 can comprise any suitable indictor, including but not limited to display 126, speaker 132, a light, an LED, and/or a vibratory device, such as a vibration motor.

While not depicted, it is yet further appreciated that mobile electronic device 101 comprises a battery and/or a power pack, or any other suitable power source.

In any event, it should be understood that a wide variety of configurations for mobile electronic device 101 are contemplated.

Turning now to notification device 103, as depicted in FIG. 1, it is contemplated that notification device 103 comprises a device enabled to provide notifications associated with mobile electronic device 101. Hence, body 149 of notification device 103 is generally enabled to mate with mobile electronic device 101 and/or housing 109. In some implementations, as described below with reference to FIG. 2, body 149 comprises a holster for receiving mobile electronic device 101. The holster can comprise any suitable apparatus for carrying mobile electronic device 101, including, but not limited to, a sleeve, a sheath, a carrying case, a wallet, a folder, a portfolio, bag and/or other receptacle. However, in other implementations, body 149 can be planar and/or a sheet which is fixable to housing 109, as described below with reference in to FIG. 13. However, other implementations of body 149 are within the scope of present implementations. For example, body 149 could also comprise a flexible skin (e.g. comprising plastic and/or rubber) enabled to wrap around at least a portion of mobile electronic device 101 to ruggedize mobile electronic device 101.

Indicator 145 can comprise any suitable indicator and/or notification device including, but not limited to, one or more of an LED, a light, and a display. While each of these indicators comprise quiet indicators, the present specification is not so limiting and, in yet further implementations, indicator 145 can yet further include, but is not limited to one or more of a speaker and a vibration device. Body 149 is hence suitably adapted to house indicator 145.

Circuit 160 is generally enabled to control indicator 145 based on signals received from induction device 155. In implementations where indicator 145 comprises an LED, circuit 160 can comprise one or more of a conversion circuit, regulating circuit (including but not limited to an output low drop-out regulator (LDO)) and a timing circuit, as described below with reference to FIGS. 3 and 4. However, in implementations where indicator 145 comprises a display, circuit 160 is adapted to control the display, as described below with reference to FIGS. 11 and 12.

Turning now to induction devices 125, 155, it is appreciated that induction devices 125, 155 are generally enabled to interact with each other when in proximity, and hence can be similar types of induction devices. In particular non-limiting implementations, each of induction devices 125, 155 comprise near field communication (NFC) antennas, including, but not limited to, NFC antennas, such as NFC loop antennas. Hence, signals 180 are appreciated to comprise NFC signals; furthermore, protocols for communicating between mobile electronic device 101 and notification device 103 are based on NFC protocols. However, other types of induction devices are within the scope of present implementations. For example, induction devices 125, 155 can be based on RFID (radio frequency identification) antennas and technology, and signals 180 can comprise RFID signals; furthermore protocols for communicating between mobile electronic device 101 and notification device 103 are based on RFID protocols.

As such, it is further appreciated that when body 149 is mated with mobile electronic device 101, induction devices 125, 155 are in proximity with one another, as will presently be explained.

Figure 2:
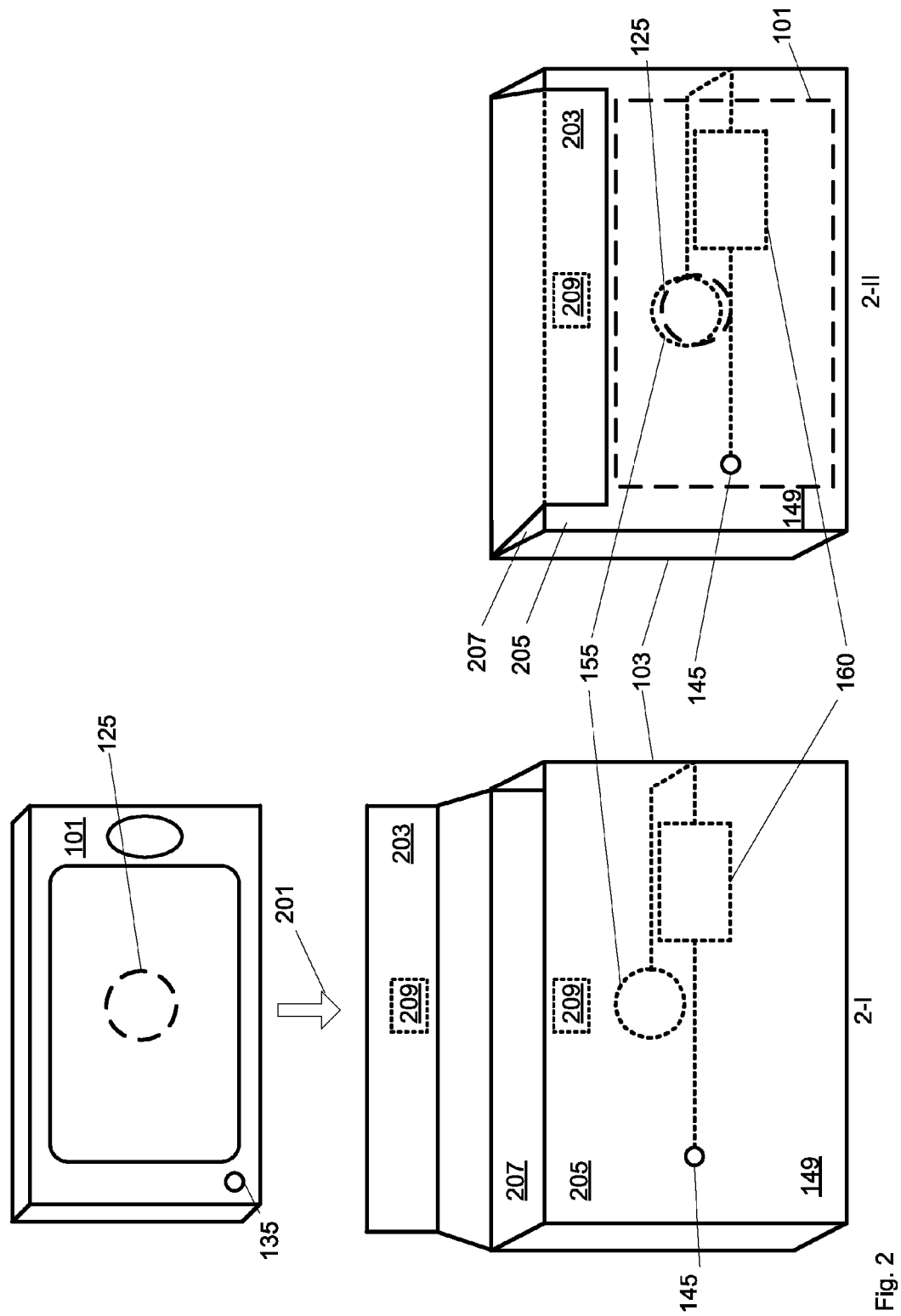
FIG. 2 depicts a sequence for mating the mobile electronic device of FIG. 1 with a holster implementation of the notification device of FIG. 1, as well as relative locations of components thereof, according to non-limiting implementations.

Attention is next directed to FIG. 2, which depicts a sequence in which mobile electronic device 101 is received in notification device 103, notification device 103 comprising a holster for mobile electronic device 101, according to non-limiting implementations. In a view 2-I, mobile electronic device 101 is being placed into notification device 103 as indicated by arrow 201. View 2-I further depicts a relative location of induction device 125 within mobile electronic device 101: specifically, in example implementations, induction device 125 is located in the approximate centre of mobile electronic device 101; furthermore, while mobile electronic device 101 is depicted from a front perspective view, it is appreciated that induction mobile electronic device 101 is located towards a rear side of mobile electronic device 101 such that signals are transmitted and received by induction device 125 via a rear side of mobile electronic device 101, for example signal 180.

FIG. 2 also shows indicator 135 in the form of an LED on a front of mobile electronic device 101. When mobile electronic device 101 is received in notification device 103, indicator 135 is obscured by body 149 of notification device 103: in other words, notification device 103 encases mobile electronic device 101 thereby obscuring indicator 135. It is yet further appreciated that, in these implementations, notification device 103 (i.e. the holster) is closable via a flap 203, however, in other implementations, notification device 103 does not comprise a flap.

FIG. 2 further depicts indicator 145, in the form of an LED which is viewable via an aperture, window or the like in body 149, connected to circuit 160, which in turn is connected to induction device 155. It is appreciated that induction device 155 and circuit 160 are encased by body 149, and are hence depicted in stippled lines. For example, a viewer will be generally aware of indicator 145 but unaware of induction device 155 and circuit 160.

Indicator 145 is depicted at a front wall 205 of body 149. However, induction device 155 is located at a rear wall 207 of body 149 such that when mobile electronic device 101 is received in notification device 103 facing front wall 205, induction devices 125, 155 are one or more of proximal to each other and aligned with each other, such that signals transmitted by induction device 125 can be received by induction device 155. In other words, as induction device 125 is generally located at rear side of mobile electronic device 101, induction device 155 is correspondingly located at rear wall 207 such that when mobile electronic device 101 is placed into notification device 103 facing front wall 205, induction devices 125, 155 are proximal each other.

Further while circuit 160 is depicted as located at front wall 205 of mobile electronic device 101, circuit 160 can alternatively be located at rear wall 207. Indeed, in some implementations, circuit 160 comprises induction device 155, and hence induction device 155 and circuit 160 can be co-located.

As at least indicator 145 and induction device 155 are located on opposing walls, the components of notification device 103 can be connected via one or more of fly wires and flex cables through body 149.

In any event, as depicted in view 2-II, when mobile electronic device 101 is received in notification device 103 (mobile electronic device 101 depicted in outline to indicate enclosure in notification device 103) induction devices 125, 155 are one or more of in proximity and generally aligned such that when mobile electronic device 101 transmits signals 180 via induction device 125, signals 180 are received by induction device 155 to control indicator 145. Hence, in view 2-II, the general position of induction device 125 is also depicted in stippled lines relative to induction device 155. However, the positions of induction devices 125, 155 are appreciated not to be limited by depictions thereof. Rather, respective locations of induction devices 125, 155 are complimentary to one another respectively at housing 109 and body 149, such that when mobile electronic device 101 is received in (i.e. mated with) notification device 103, induction devices 125, 155 are in proximity to one another.

Hence, in general, induction device 155 is positioned at notification device 103 (i.e. the holster) for interacting with respective induction device 125 when mobile electronic device 101 is mated with notification device 103. Thus, when mobile electronic device 101 is mated (i.e. contained) in notification device 103 such that indicator 135 is obscured, and a notification is to be provided at mobile electronic device 101, for example, in the form of indicator 135 blinking, processor 120 transmits one or more signals 180 from induction device 125 to induction device 155, which causes indicator 145 to provide an indication of the notification associated with mobile electronic device 101. For example, rather than indicator 135 blinking, indicator 145 blinks.

In some of these implementations, when mobile electronic device 101 transmits signals 180 to induction device 125 to control indicator 145, processor 120 disables notifications at mobile electronic device 101. Mobile electronic device 101 can furthermore be enabled to detect proximity to notification device 103, and disable notifications when such proximity is detected. For example, mobile electronic device 101 can be enabled to periodically poll notification device 103 using induction device 125 and when a return signal is received from induction device 155, mobile electronic device 101 can determine proximity to notification device 103. Hence, in these implementations, notification device 103 can be enabled to return a signal in response to being polled.

Alternatively, and as depicted in FIG. 2, notification device 103 can further comprise at least one magnet 209, which can be detected by mobile electronic device 101 via a magnetometer or the like (i.e. mobile electronic device 101 can comprise an optional magnetometer or the like, positioned to detect magnet(s) 209), thereby causing mobile electronic device 101 to enter a holster mode: for example, display 126 can be disabled in the holster mode. In any event, when mobile electronic device 101 detects proximity of notification device 103, indicator 135 can also be disabled, and rather than control indicator 135 to provide notifications, mobile electronic device 101 can control induction device 125 to transmit signals to notification device 103 to control indicator 145.

Furthermore, when indicator 145 comprises an LED, mobile electronic device 101 can be enabled to transit a plurality of signals from induction device 125 to induction device 155 to cause the LED to blink. In other words, indicator 145/LED turns on for a period of time for each signal transmitted to induction device 155.

It is yet further appreciated that, in depicted implementations, magnets 209 can be located in flap 203 and in front wall 205 to magnetically hold flap 203 closed against front wall 205.

Furthermore, when notification device 103 comprises at least one magnet 209, induction device 155 can be positioned to avoid field lines of the at least one magnet 209. In other words, induction device 155 is positioned at body 149 so that at least one magnet 209 does not interfere with the interaction between induction devices 125, 155.

Figure 3:
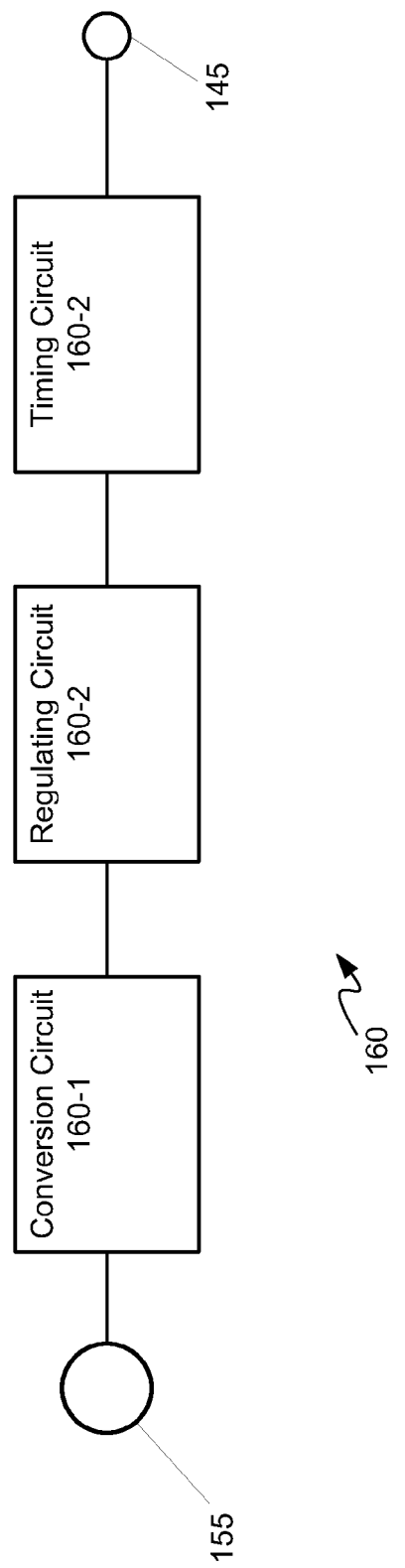
FIG. 3 depicts a circuit for controlling an indicator of the notification device of FIG. 1, according to non-limiting implementations.

Attention is next directed to FIG. 3 which depicts a non-limiting example implementation of circuit 160, according to non-limiting implementations. In FIG. 3 it is assumed that induction device 155 comprises an NFC loop antenna and that indicator 145 comprises an LED. Circuit 160 hence comprises a circuit for receiving NFC signals/pulses from an NFC loop antenna and controlling an LED. Specifically, FIG. 3 comprises a conversion circuit 160-1, including but not limited to a circuit bridge rectifier to convert signals received at induction device 155 to DC (direct current) signals, as NFC signals are generally AC (alternating current) pulses. Conversion circuit 160-1, in conjunction with induction device 155, can also be referred to an energy harvesting circuit as energy and/or power is received and/or "harvested" from induction device 125 via circuit 1601-1.

Output from conversion circuit 160-1 is received at a regulating circuit 160-2 enabled to regulate the voltage of indicator 145 (i.e. the LED). Circuit 160-2 can hence comprise at least one LDO (low drop-out regulator) device (e.g. see FIG. 4) and any other circuitry and/or electrical components to regulate power received from circuit 160-1.

Output from circuit 160-2 is received at timing circuit 160-3 which is enabled to control the timing of indicator 145 (i.e. the LED), including but not limited to the flashing of the LED. For example, timing circuit 160-3 can comprises at least one capacitor that discharges once an LDO in regulating circuit 160-2 shuts off and continues to switch the LED on for a given period of time even in the absence of an NFC signal/pulse from induction device 125. Hence, each "flash" of the LED is about the same length. In some implementations, timing circuit 160-3 can be optional.

It is yet further appreciated that circuit 160 does not include a source of power, such as a battery, a power pack or the like, but that indicator 145 is powered via circuit 160 using signals 180 received from induction device 125. In other word the power in signals 180 received from induction device 125 powers notification device 103, and circuit 160 is enabled for energy harvesting in conjunction with induction device 155. Put another way, in these implementations, notification device 103 comprises a passive NFC device.

Figure 4:
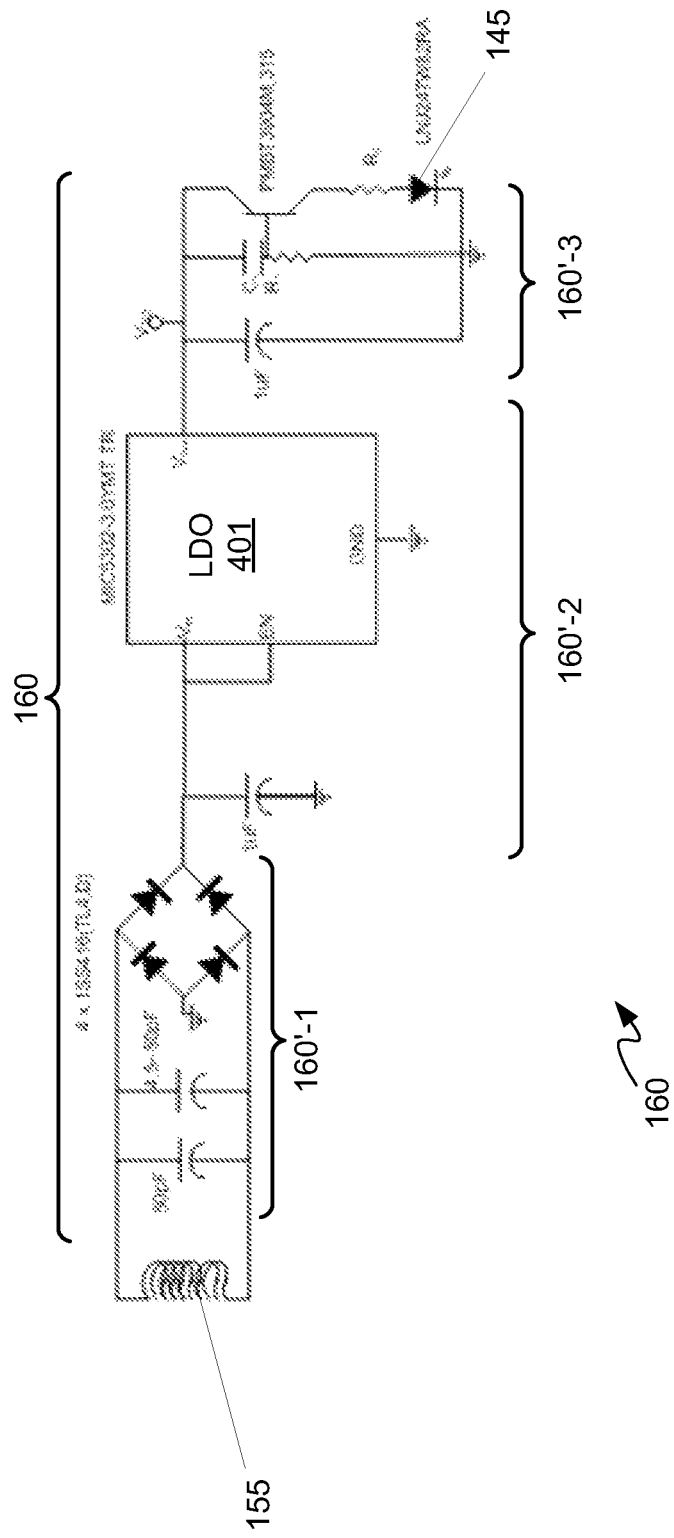
FIG. 4 depicts an alternative circuit for controlling an indicator of the notification device of FIG. 1, according to non-limiting implementations.

Attention is next directed to FIG. 4, which depicts a specific non-limiting example of circuit 160, according to non-limiting implementations, for connecting induction device 155 (again, an NFC antenna) to indicator 145 (again, an LED). In these implementations, circuit 160 comprises conversion circuit 160'-1, a regulating circuit 160'-2 and a timing circuit 160'-3, each respectively similar to similar to conversion circuit 160-1, a regulating circuit 160-2 and a timing circuit 160-3. In these specific non-limiting implementations, circuit 160'-1 comprises a circuit bridge rectifier, regulating circuit 160'-2 comprises an LDO 401 and timing circuit 160'-3 comprises capacitors, resistors and at least one transistor arranged to control a length of a flash of an LED.

It is further appreciated that LDO 401 can be enabled to control electric static discharge (ESD) and/or circuit 160 can include separate components for controlling ESD.

Figure 5:
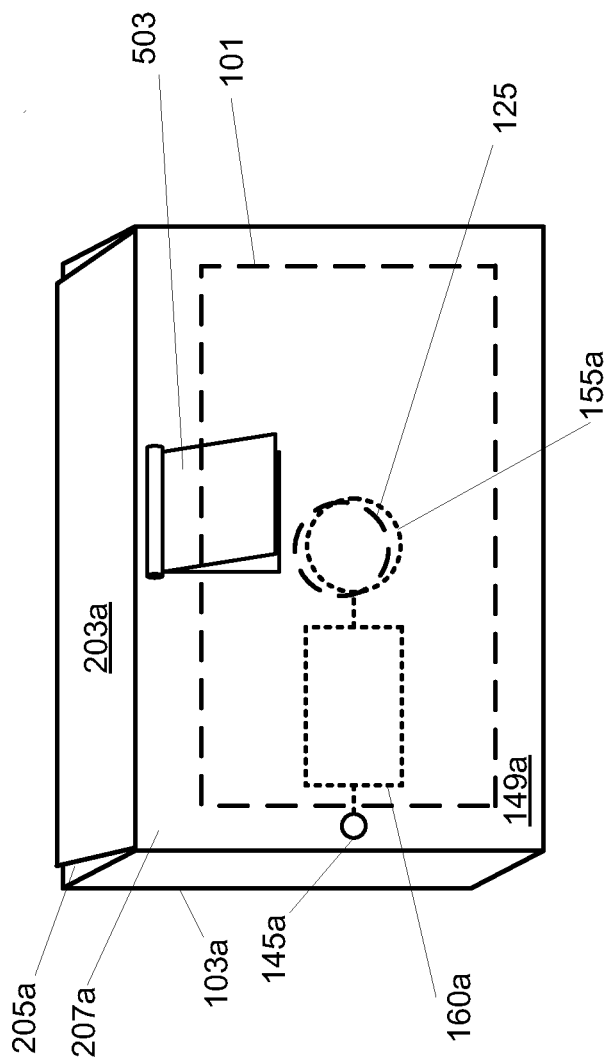
FIG. 5 depicts an alternative holster implementation of a notification device and relative locations of components thereof, according to non-limiting implementations.

Furthermore, while components of circuit 160 in both in FIGS. 4 and 5 are depicted as discrete from one another, in other implementations one or more of components and/or one or more of circuits 160-1, 160-2, 160-3 (and/or circuits 160'-1, 160'-2, 160'-3) can be integrated into a single device and/or a single component.

Attention is next directed to FIG. 5 which depicts an alternative implementation of a notification device 103a for providing notifications associated with mobile electronic device 101, according to non-limiting implementations. Notification device 103a is substantially similar to notification device 103 with like elements having like numbers but with an "a" appended thereto and comprises a holster comprising a front wall 205a and a rear wall 207a, an indicator 145a, a body 149a, an induction device 155a and a circuit 160a (which can be similar to one or more of circuits 160, 160', or any other suitable circuit). In these implementations, rear wall 207a comprises induction device 155a, circuit 160a and indicator 145a. Rear wall 207a further comprises a clip 503 for clipping notification device 103a to clothing, a belt, or the like. Mobile electronic device 101 is hence mated/received in notification device 103a with mobile electronic device 101 facing front wall 205a. Hence, when notification device 103a is unclipped from the clothing or the like, and placed on a surface with rear wall 207a/clip 503 upwards, indicator 145a is visible and mobile electronic device 101 can control indicator 145a via signals 180 transmitted from induction device 125 to induction device 155a. Otherwise notification device 103a functions similar to notification device 103.

Figure 6:
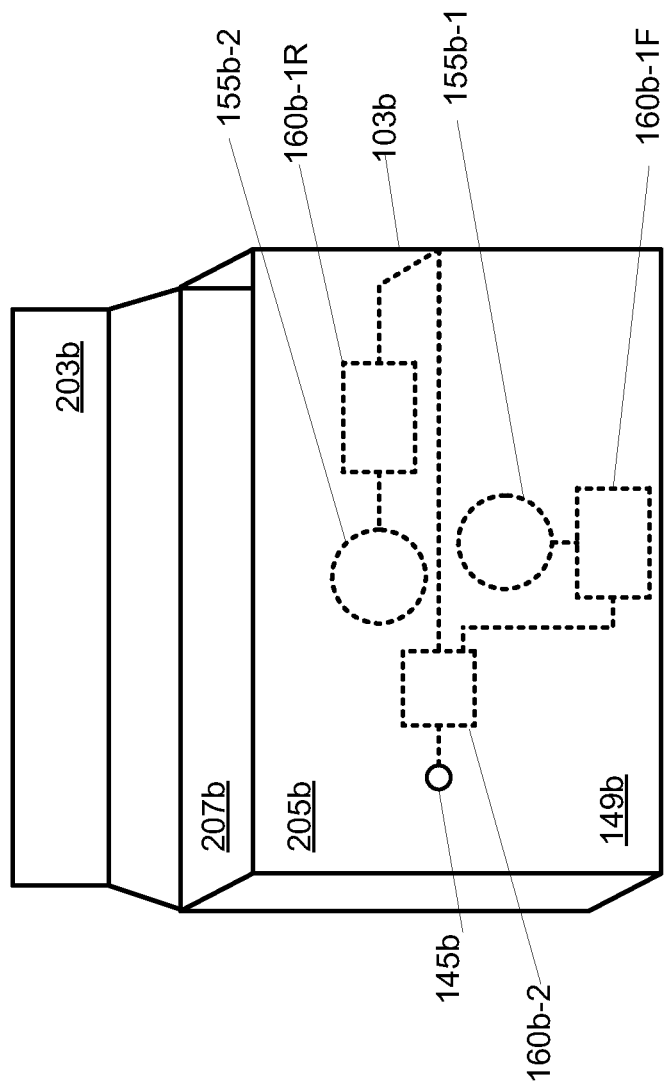
FIG. 6 depicts an alternative holster implementation of a notification device and relative locations of components thereof, according to non-limiting implementations.

With both of devices 103, 103a, mobile electronic device 101 must be placed with display 126 facing a front wall of devices 103, 103a to align induction devices 125, 155 (or 155a). Hence, attention is next directed to FIG. 6 which depicts yet another implementation of a notification device 103b for providing notifications associated with mobile electronic device 101. Notification device 103b is substantially similar to notification device 103 with like elements having like numbers but with a "b" appended thereto and comprises a holster comprising a flap 203b, a front wall 205b, a rear wall 207b, an indicator 145b, and a body 149b. However in contrast to notification device 103 and notification device 103a, notification device 103b comprises two induction devices 155b-1, 155b-2, induction device 155b-1 located at front wall 205b, and induction device 155b-2 located at rear wall 207b. While not depicted, notification device 103b can further comprise magnets similar to magnets 209.

Notification device 103b further comprises a distributed circuit for controlling indicator 145b, the distributed circuit comprising two conversion circuits 160b-1F, 160b-1R, each of which can be similar to conversion circuit 160b-1 described above: circuit 160b-1F receives signals 180 from front induction device 155b-1 and circuit 160b-1R receives signals 180 from rear induction device 155b-2. The distributed circuit further comprises a regulating circuit 160b-2, which can be similar to regulating circuit 160-2, connected in parallel to both conversion circuits 160b-1F, 160b-1R. While not depicted, the distributed circuit can further comprise a timing circuit similar to one or more of timing circuits 160-3, 160'-3.

Hence, mobile electronic device 101 can be mated with notification device 103b with display 126 facing either front wall 205b or rear wall 207b and induction device 125 will be in proximity with one of induction device 155b-1 or induction device 155b-2. When, signals 180 are received at one of induction device 155b-1 or induction device 1005b-2 from induction device 125, undergo a DC conversion at the respective conversion circuit 160b-1F, 160b-1R, and are received at regulating circuit 160b-2 to control indicator 145b. In other words, notification device 103a comprises two induction devices 155b-1, 155b-2 each of which align with induction device 125 when mobile electronic device 101 is received in notification device 103b facing either forward or backward thereby obviating the issues with devices 103, 103a. Otherwise notification device 103b functions similar to notification device 103.

Figure 7:
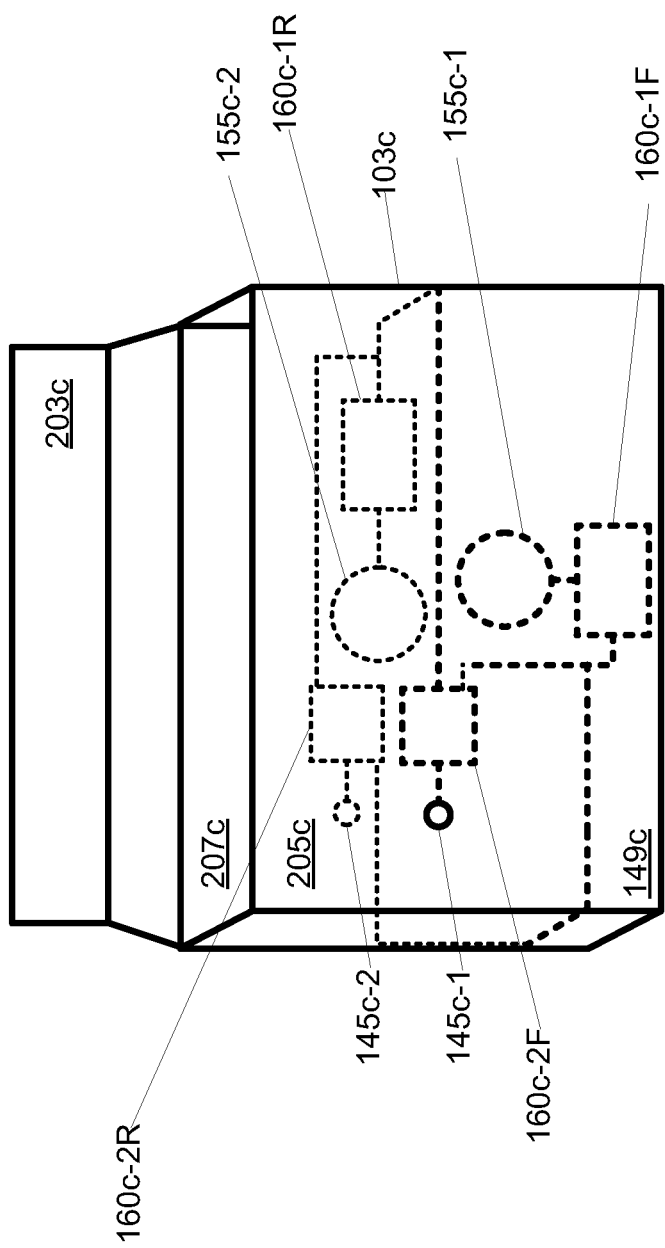
FIG. 7 depicts a perspective view of a notification device with two indicators, and relative locations of components thereof, according to non-limiting implementations.
Figure 8:
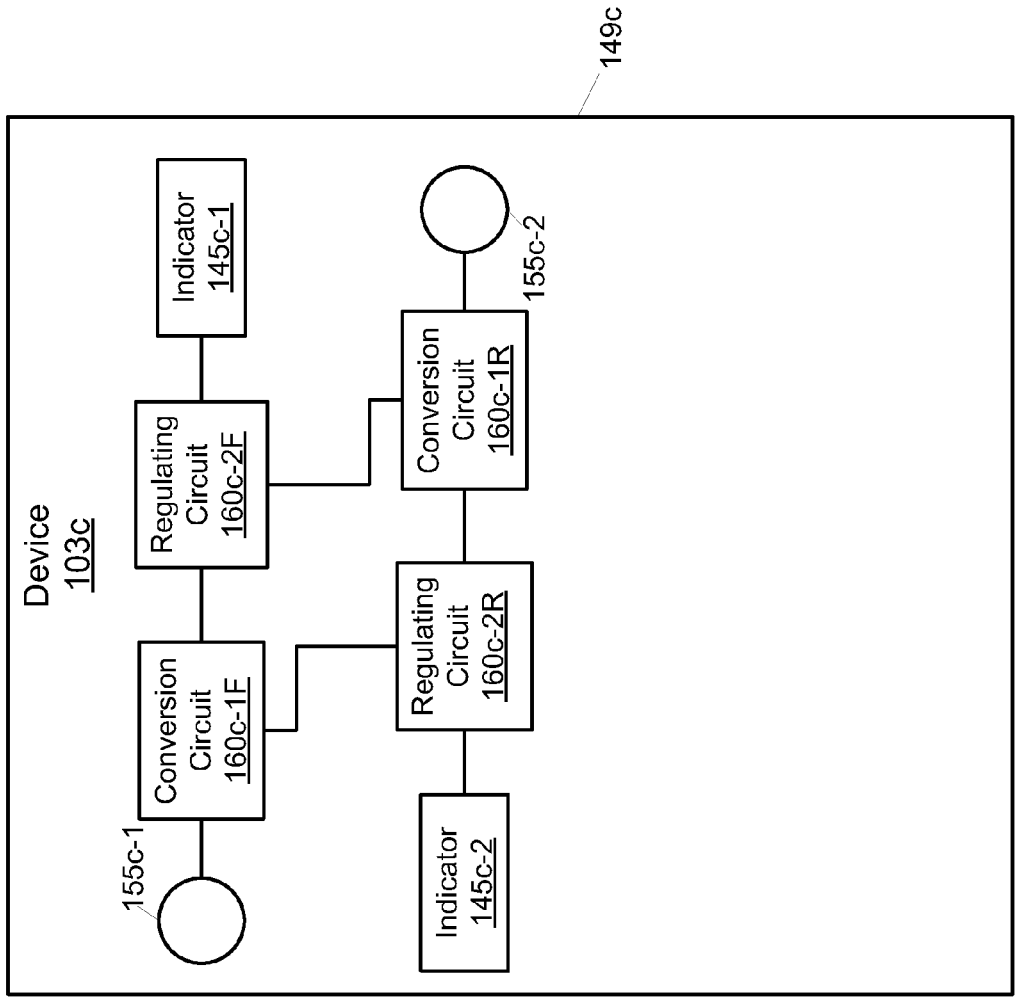
FIG. 8 depicts a schematic diagram of the notification device of FIG. 7, according to non-limiting implementations.

Attention is next directed to FIGS. 7 and 8 which respectively depict a perspective and schematic view of yet a further notification device 103c for providing notifications associated with mobile electronic device 101, according to non-limiting implementations. Notification device 103*c* is substantially similar to notification device 103 with like elements having like numbers but with a "c" appended thereto and comprises a holster comprising a flap 203*c*, a front wall 205*c*, a rear wall 207*c*, and a body 149*c*. However in contrast to devices 103, 103*a*, 103*b*, notification device 103*c* comprises a front indicator 145*c*-1 and a rear indicator 145*c*-2, and front and rear induction devices 155*c*-1, 155*c*-2 (similar to notification device 103*b*). While not depicted, notification device 103*c* can further comprise magnets similar to magnets 209.

Notification device 103*c* further comprises a distributed circuit for controlling indicators 145*c*-1, 145*c*-2, the distributed circuit comprising two conversion circuits 160*c*-1F, 160*c*-1R, each of which can be similar to conversion circuit 160-1 (and/or conversion circuit 160'-1) described above. The distributed circuit further comprises two regulating circuits 160*c*-2F, 160*c*-2R, each of which can be similar to regulating circuit 160-2 (or regulating circuit 160'-2), each connected in parallel to both conversion circuits 160*c*-1F, 160*c*-1R. While not depicted, notification device 103*c* can further comprise two timing circuits similar to one or more of timing circuits 160-3, 160'-3. Hence, mobile electronic device 101 can be mated with notification device 103*c* with display 126 facing either front wall 205*c* or rear wall 207*c* and induction device 125 will be in proximity with one of induction device 155*c*-1 or induction device 155*c*-2. Hence, signals are received at one of induction device 155*c*-1 or induction device 155*c*-2 from induction device 125, undergo a DC conversion at the respective conversion circuit 160*c*-1F, 160*c*-1R, and are received at each regulating circuit 160*c*-2F, 160*c*-2R to control both indicator 145*c*-1, 145*c*-2.

For clarity, in FIG. 7 elements at front wall 205*c* are depicted in a wider line width than elements at rear wall 207*c*. The overall distributed circuit is further depicted at FIG. 8. While not depicted, the distributed circuit of conversion circuits 160*c*-1F, 160*c*-1R and regulating circuits 160*c*-2F, 160*c*-2R, can further comprise diodes for ensuring that current flows from each conversion circuit 160*c*-1F, 160*c*-1R to each regulating circuit 160*c*-2F, 160*c*-2R, but not in the other direction.

In any event, with notification device 103*c*, mobile electronic device 101 can be inserted in any direction (front-facing and rear facing) and both of indicators 145*c*-1, 145*c*-2 can be controlled to provide notifications associated with mobile electronic device 101, as described above. In other words, body 149*c* comprises a holster, an induction device 155*c*-1 located at a first wall 205*c* of the holster for receiving the signals from mobile electronic device 101 when mated therewith, and notification device 103 further comprises induction device 155*c*-2 located at a second wall 207*c* of the holster opposite first wall 205*c* for receiving signals 180 from mobile electronic device 101 when mated with the holster in a direction opposite first induction device 155*c*-1. Induction device 155*c*-2 is connected to the distributed circuit. Notification device 103*c* further comprise a second circuit 160*c*-1R, 160*c*-2R, similar to circuit 160*b*-1R, 160*b*-2R (and/or circuit 160 and/or circuit 160'), the second circuit 160*c*-1R, 160*c*-2R connecting second induction device to one or more of indicators 145*c*-1, 145*c*-2, second circuit 160*c*-1R, 160*c*-2R enabled to receive the signals to operate one or more of indicators 145*c*-1, 145*c*-2.

Furthermore, both indicators 145*c*-1, 145*c*-2 are controlled (e.g. to blink) upon receipt of signals 180, hence the position of notification device 103*c* relative to a surface on which it is less likely to obscure both of indicators 145*c*-1, 145*c*-2. Hence, while not depicted, notification device 103 can further comprise timing circuits similar to one or more of timing circuits 160-3, 160'-3. In yet further implementations, notification device 103*c* can comprise more indicators, for example, at one or more side walls, at flap 203*c* in a bottom wall or the like.

Indeed, in all devices 103, 103*a*, 103*b*, 103*c*, the relative positions of the respective indicators is appreciated to be generally non-limiting and indeed the indicators can be placed in any position at the respective body that is likely to be visible to a user.

Figure 9:
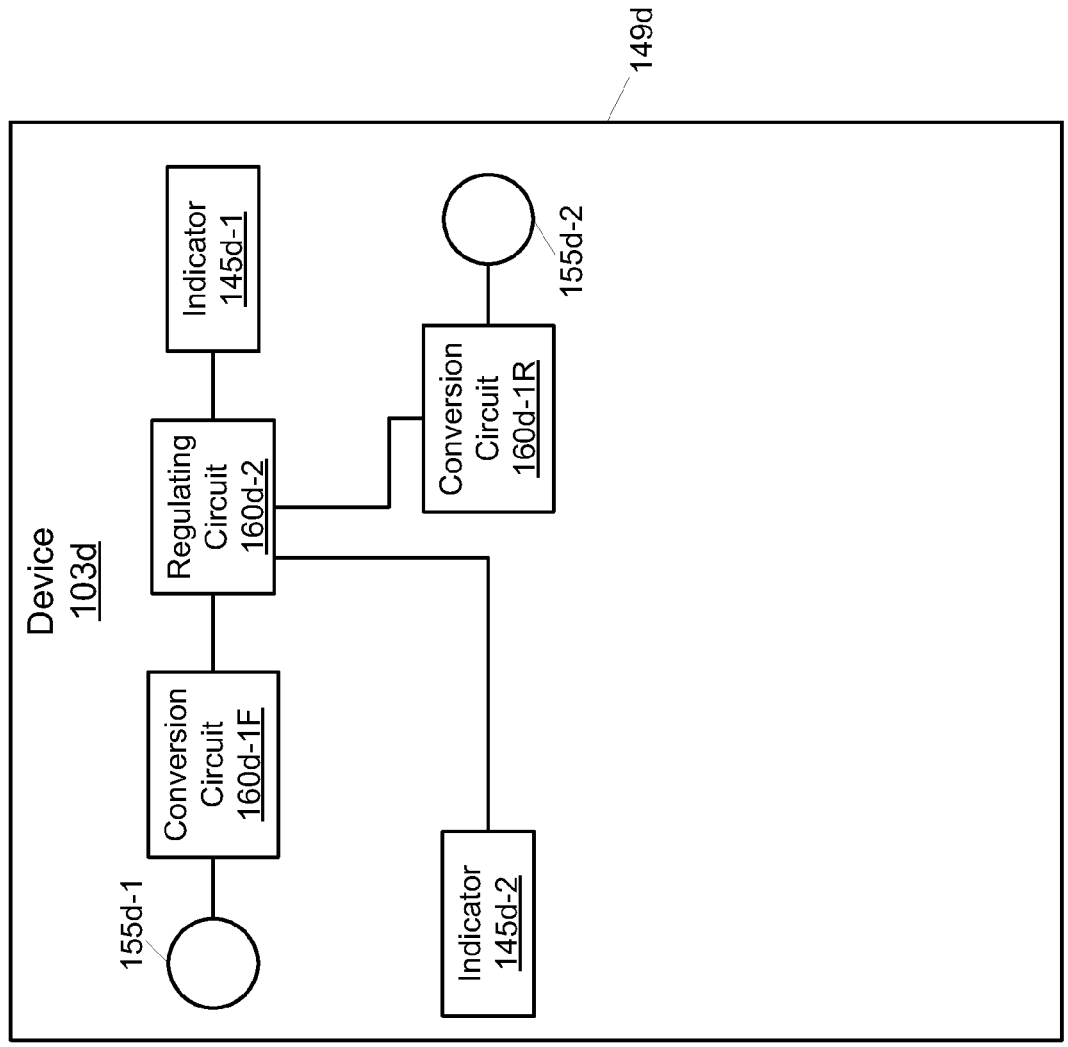
FIG. 9 depicts a schematic diagram of 1 notification device with two indicators, according to non-limiting implementations.

Attention is next directed to FIG. 9 which depicts a schematic diagram of yet a further alternative of a notification device 103*d* for providing notifications associated with mobile electronic device 101, according to non-limiting implementations. Notification device 103*d* is substantially similar to notification device 103*c* with like elements having like numbers but with a "d" appended thereto rather than a "c" and comprises a body 149*d*, which in turn comprises a holster similar to those already described. Notification device 103*d* further comprises a front indicator 145*d*-1 and a rear indicator 145*d*-2, respective conversion circuits 160*d*-1F, 160*d*-1R, and one regulating circuit 160*d*-2 connected in parallel to both indictors 145*d*-1, 145*d*-2. In other words, notification device 103*d* functions similar to notification device 103*c*, but the one regulating circuit 160*d*-2 controls two indicators 145*d*-1, 145*d*-2 rather than one indicator. While not depicted, notification device 103*d* can further comprise a timing circuit similar to one or more of timing circuits 160-3, 160'-3.

Figure 10:
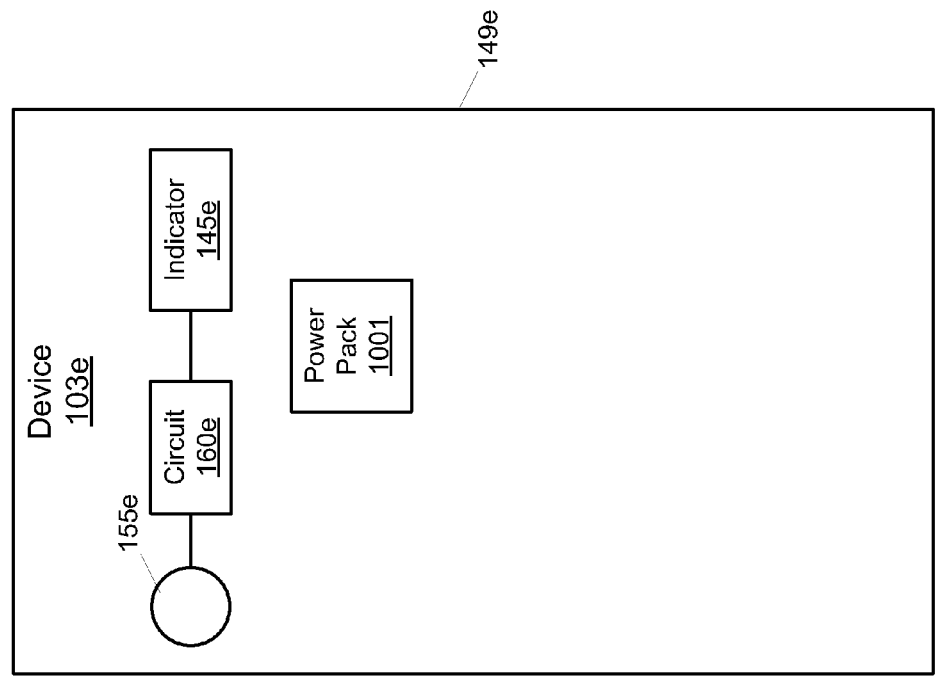
FIG. 10 depicts a schematic diagram of a notification device with an on-board power pack, according to non-limiting implementations.

Attention is next directed to FIG. 10 which depicts a schematic diagram of yet a further alternative of a notification device 103*e* for providing notifications associated with mobile electronic device 101, according to non-limiting implementations. Notification device 103*e* is substantially similar to notification device 103 with like elements having like numbers but with an "e" appended thereto. Notification device 103*e* comprises a body 149*e* which houses an indicator 145*e*, an induction device 155*e* and a circuit 160*e*. However, in contrast to implementations described heretofore, notification device 103*e* further comprises a power pack 1001, for example a battery or any suitable on-board power source, which can be replaceable and/or rechargeable.

In any event, power pack 1001 can power one or more of indicator 145*e* and circuit 160*e* when signals 180 are received at induction device 155*e* from induction device 125 when mobile electronic device 101 is mated with notification device 103*e*. In other words, rather than notification device 103*e* being a passive device powered via energy harvesting, notification device 103*e* is an active device powered via power pack 1001 and controlled inductively via the interaction between induction devices 125, 155.

Figure 11:
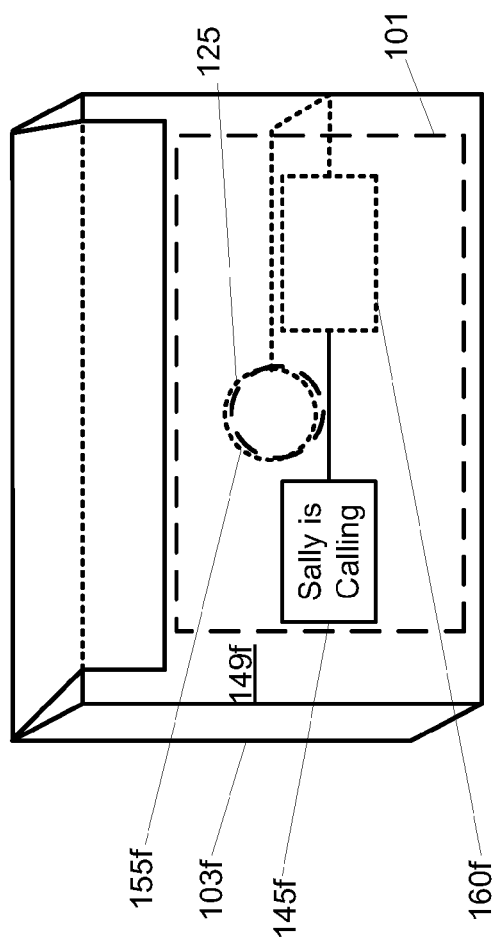
FIG. 11 depicts a perspective view of a notification device with a display indicator, and relative locations of components thereof, according to non-limiting implementations.
Figure 12:
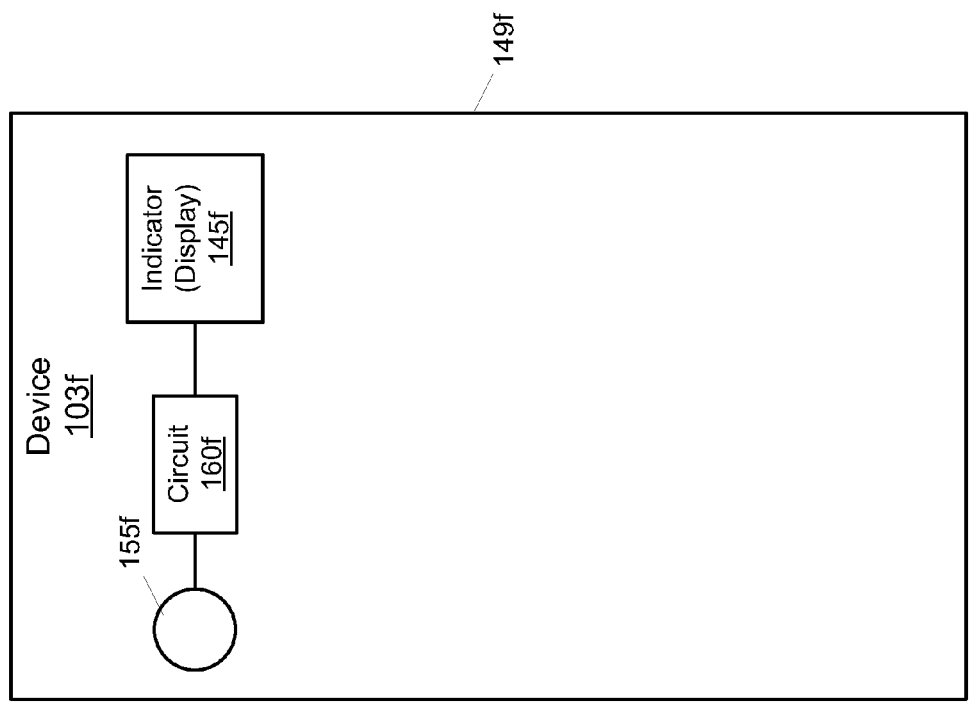
FIG. 12 depicts a schematic diagram of the notification device of FIG. 11, according to non-limiting implementations.

Attention is next directed to FIGS. 11 and 12 which respectively depict a perspective and schematic view of yet a further notification device 103*f* for providing notifications associated with mobile electronic device 101, according to non-limiting implementations. Notification device 103*f* is substantially similar to notification device 103 with like elements having like numbers but with an "f" appended thereto and comprises a holster similar to those described above. While not all elements of notification device 103*f* are labelled, it is appreciated that the holster of notification device 103*f* is similar to the holster of notification device 103. Otherwise notification device 103*f* comprises a body 149*f*, an indicator 145*f*, a circuit 160*f* and an induction device 155*f* enabled to interact with induction device 125 of mobile electronic device 101 when mated with thereto, as depicted. However, in these implementations, indicator 149*f* comprises a display, such as an LCD, or OLED, or the like, and signals 180 received from induction device 125 further comprise data to be provided at the display, the data associated with a notification of mobile electronic device 101.

For example, when a phone call is received at mobile electronic device 101, and mobile electronic device 101 is mated with/contained in notification device 103/holster, signals 180 transmitted to notification device 103*f* can comprise data associated with the phone call (for example the text "Sally is Calling" as depicted). The data received with signals 180 is then rendered and/or displayed at indicator 145*f*/display device. It is yet further appreciated that circuit 160*f* is hence enabled to control the display to provide a rendering of the data received in signals 180. Notification device 103*f* can be passive (i.e. no power source) or active (i.e. further comprises an on board power source) as desired. Further while indicator 145*f* is depicted at the front wall of the holster, indicator 145*f* can alternatively be located at the rear wall of the holster, and/or notification device 103*f* can comprise indicators/displays at both the front wall and the rear wall.

Figure 13:
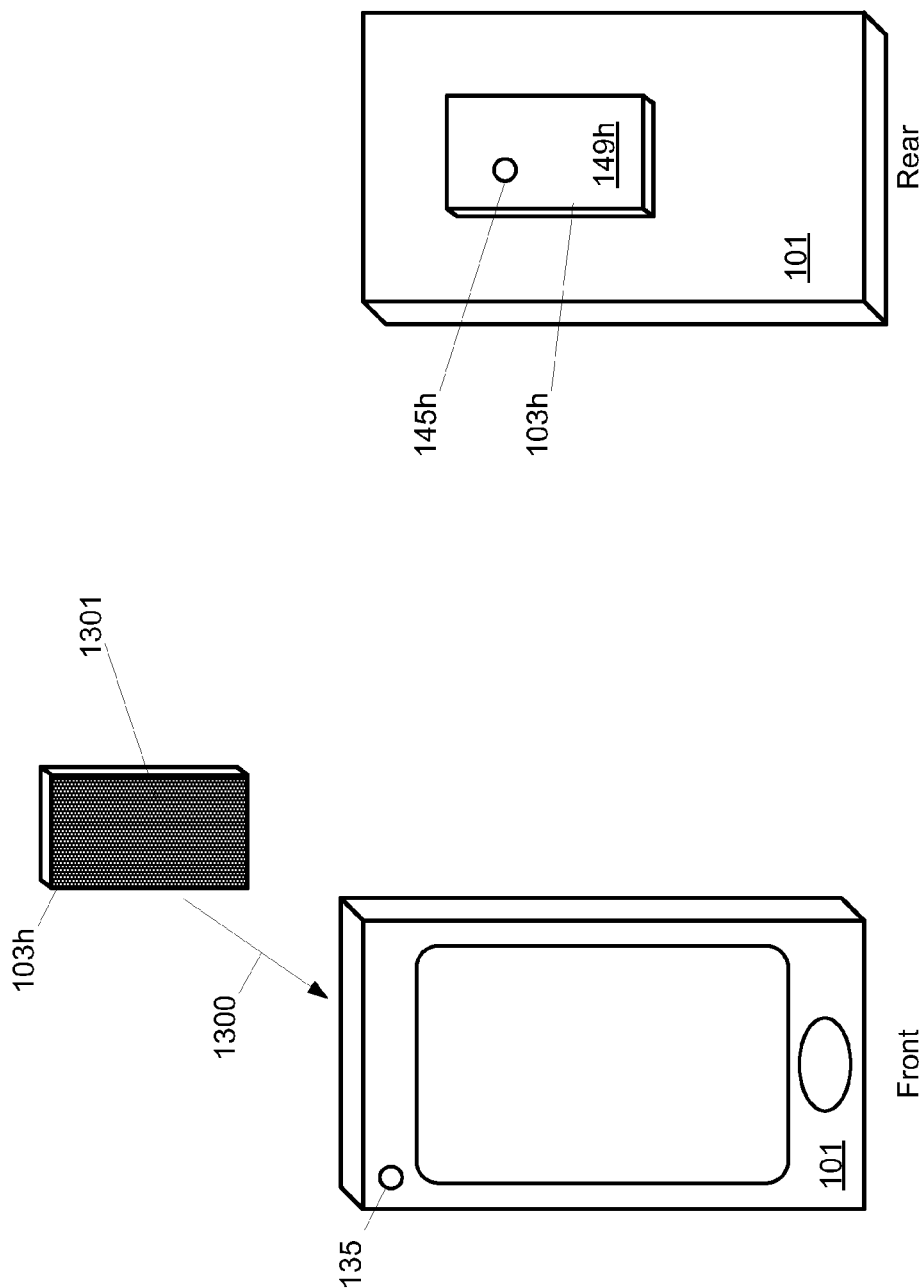
FIG. 13 depicts front and rear views of a planar implementation of a notification device being mated to a mobile electronic device, according to non-limiting implementations.

Attention is next directed to FIG. 13 which depicts front and rear views of yet another alternative implementation of a notification device 103*h* for providing notifications associated with mobile electronic device 101, according to non-limiting implementations. FIG. 13 further depicts notification device 103*h* mating with mobile electronic device 101 as indicated by arrow 1300 in the front view, with notification device 103*h* mated with mobile electronic device 101 in the rear view. While only indicator 145*h* and body 149*h* of notification device 103*h* are depicted in FIG. 1, it is appreciated that notification device 103*h* has the same general schematic of notification device 103 in FIG. 1 and hence further comprises a circuit, similar to circuit 160, connecting indicator 145*h* to an induction device, similar to induction device 155. However, in these implementations, body 149*h* comprises a sheet and/or a plane and a tacky material 1301 on a side opposite indicator 145*h*, such that to mate body 149*h* with notification device 103*h*, tacky material 1301 sticks to mobile electronic device 101.

To use notification device 103*h*, notification device 103*h* is mated/applied to mobile electronic device 101, tacky side down, in an area of mobile electronic device 101 where induction device 125 is located, for example a rear side of mobile electronic device 101, tacky material 1301 fixing notification device 103*h* to mobile electronic device 101. While a user of notification device 103*h* may not immediately know where induction device 125 is located, notification device 103*h* can be provided with instructions showing how and where to apply notification device 103*h* to mobile electronic device 101 such the respective induction devices are one or more of in proximity and generally aligned.

Further, while indicator 145*h* is depicted as a round LED, in other implementations, indicator 145*h* can be in the shape of a logo or the like and can comprise one or more of an LED in combination with a light scattering material and an electroluminescent material. Further, indicator 145*h* can comprise a display as described above with reference to FIGS. 11 and 12.

Further, tacky material 1301 comprises a glue that can be one of semi-permanently attach notification device 103*h* to mobile electronic device 101 or removably attach notification device 103*h* to mobile electronic device 101. In yet further implementations, notification device 103*h* can be flexible or inflexible, and body 149*h* can be made of a plastic, metal and/or a combination thereof.

Furthermore, body 149*h* can be as thin as a few millimeters to accommodate an NFC antenna, the indicator and the associated circuit, thereby adding very little thickness to notification device 103*h*.

In any event, notification device 103*h* can be applied to a rear side of mobile electronic device 101 and then, when mobile electronic device 101 is face down and indicator 135 is obscured, indicator 145*h* can be controlled via induction device 125 interacting with the induction device of notification device 103*h* to provide notifications associated with mobile electronic device 101.

In yet further implementations, notification devices described herein can comprise a skin that wraps around at least a portion of mobile electronic device 101, for example to ruggedize mobile electronic device 101. The induction device at the skin can be located to align with induction device 125 when the skin is mated with mobile electronic device 101. One or more indicators can be located on the skin to be controlled by mobile electronic device 101, as described above. The one or more indicators can be connected to the induction device via a circuit located at/in the skin, as described above.

Hence, provided herein are various implementations of a notification device that inductively couples to a mobile electronic device to provide notifications associated with the mobile electronic device. In some implementations, the notification device comprises a holster with one or more indicators provided at the holster. Hence, when the mobile electronic device is contained/mated with the holster and an indicator of the mobile electronic device is no longer visible (and/or the mobile electronic device enters a holster mode and/or hibernation mode), an induction device in the holster can inductively couple with an induction device at the mobile electronic device to received signals there from to control and/or power the holster indicator(s). Hence, notifications associated with the mobile electronic device are provided at the holster indicator(s) without requiring a wired connection thereto.

When the notification device has a planar shape and a tacky material appliqué, as depicted in FIG. 13, the notification device enables notifications associated with the mobile electronic device to be provided at the rear side of the mobile electronic device without adding significant thickness or weight thereto. Hence mobile electronic device While is appreciated that notification devices described herein could also be used with non-portable devices that comprise an induction device (such as an NFC antenna), the notification device may be especially advantageous for mobile electronic devices that are handheld. Implementation of one or more embodiments may realize one or more additional benefits as well, such as flexibility of implementation. Further, this disclosure can be adapted to a variety of mobile electronic devices, a variety of holsters, and a variety of bodies, including, but not limited to, planar bodies and skins.

Those skilled in the art will appreciate that in some implementations, the functionality of mobile electronic device 101 and notification devices 103, 103*a*, 103*b*, 103*c*, 103*d*, 103*e*, 103*f*, 103*g*, 103*h* can be implemented using pre-programmed hardware or firmware elements (e.g., application specific integrated circuits (ASICs), electrically erasable programmable read-only memories (EEPROMs), etc.), or other related components. In other implementations, the functionality of mobile electronic device 101 and notification devices 103, 103*a*, 103*b*, 103*c*, 103*d*, 103*e*, 103*f*, 103*g*, 103*h* can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   an indicator;
   a holster configured to mate with a mobile electronic device, the holster comprising the indicator such that when the holster is mated to the mobile electronic device, the indicator is not obscured by the holster;
   a first induction device for wirelessly receiving signals from the mobile electronic device to control the indicator, the first induction device located at a first wall of the holster for receiving the signals from the mobile electronic device when mated therewith;
   a second induction device located at a second wall of the holster opposite the first wall for receiving the signals from the mobile electronic device when mated with the holster in a direction opposite the first induction device; and,
   a circuit connecting the first induction device to the indicator, the circuit configured to receive the signals and control the indicator in response thereto.

2. The device of claim 1, wherein the first induction device and the second induction device are each positioned at the holster for interacting with a respective induction device located at the mobile electronic device, the respective induction device for transmitting the signals.

3. The device of claim 1, wherein the holster comprises at least one magnet for interacting with a holster indicator at the mobile electronic device, the first induction device and the second induction device each positioned at the holster to avoid the at least one magnet.

4. The device of claim 1, wherein the indicator comprises one or more of a light emitting diode (LED), a light, and a display.

5. The device of claim 1, wherein each of the first induction device and the second induction device comprises one or more of an induction antenna, an antenna coil, and a near field communication (NFC) antenna, a loop antenna, an NFC loop antenna and RFID (radio frequency identification) antenna.

6. The device of claim 1, wherein the circuit comprises one or more of a conversion circuit, an energy harvesting circuit, a DC conversion circuit, a regulating circuit, an output low drop-out regulator (LDO) and a timing circuit.

7. The device of claim 1, wherein the circuit is further configured to power the indicator from power received via the signals.

8. The device of claim 1, further comprising one or more of a battery and a power pack for powering one or more of the circuit and the indicator.

9. The device of claim 1, wherein the indicator comprises one or more of an LED and a light, and the circuit is further configured to flash one or more of the LED and the light when the signals are received.

10. The device of claim 1, wherein the second induction device is connected to the circuit.

11. The device of claim 1, further comprising a second circuit similar to the circuit, the second circuit connecting the second induction device to the indicator, the second circuit further configured to receive the signals to operate the indicator.

12. The device of claim 11, further comprising a second indicator, wherein the indicator is located at the first wall and the second indicator is located at the second wall, each of the indicator and the second indicator connected to each of the induction device and the second induction device, each of the indicator and the second indicator controlled by one or more of the circuit and a second circuit.

13. The device of claim 1, wherein the signals comprise NFC polling mode signals, and the circuit is further configured to receive the NFC polling mode signals and control the indicator in response thereto.

14. The device of claim 1, wherein the indicator comprises a display, the signals comprise data to be provided at the display, and the circuit is further configured to control the display to provide a rendering of the data.

15. A system comprising:
   a mobile electronic device; and
   a device comprising: an indicator; a holster configured to mate with the mobile electronic device, the holster comprising the indicator such that when the holster is mated to the mobile electronic device, the indicator is not obscured by the holster; a first induction device for wirelessly receiving signals from the mobile electronic device to control the indicator, the first induction device located at a first wall of the holster for receiving the signals from the mobile electronic device when mated therewith; a second induction device located at a second wall of the holster opposite the first wall for receiving the signals from the mobile electronic device when mated with the holster in a direction opposite the first induction device; and, a circuit connecting the first induction device to the indicator, the circuit configured to receive the signals and control the indicator in response thereto.

16. The system of claim 15, wherein the mobile electronic device comprises a respective induction device configured to transmit the signals.

17. The system of claim 16, wherein the first induction device, the second induction device and the respective induction device each comprise respective NFC antennas, and the mobile electronic device is configured to enter an NFC polling mode to transmit NFC polling signals when a notification occurs at the mobile electronic device.

* * * * *